United States Patent Office 3,267,094
Patented August 16, 1966

3,267,094
MORPHANTHRIDINE DERIVATIVES
Alexander E. Drukker, Milwaukee, and Claude I. Judd, Mequon, Wis., assignors to Colgate-Palmolive Company, a corporation of Delaware
No Drawing. Filed Aug. 23, 1963, Ser. No. 304,241
20 Claims. (Cl. 260—239)

This invention relates to novel chemical compounds and processes of preparing the same. More particularly, this invention is concerned with novel basic 5,6-dihydromorphanthridine derivatives, processes of producing them and pharmacological and therapeutic uses for such compounds.

This application is a continuation-in-part of copending application Serial No. 223,263 filed Sept. 12, 1962, which is a continuation-in-part of Serial No. 97,159, filed March 21, 1961.

According to one aspect of the present invention there are provided novel basic 5,6-dihydromorphanthridines of the formula

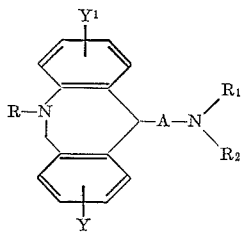

wherein Y and $Y^1$ are hydrogen, halo groups and particularly chloro and bromo, lower alkoxy such as methoxy and ethoxy, lower alkyl such methyl and ethyl, thio-lower alkyl such as thiomethyl and thioethyl, and trifluoromethyl, R is hydrogen, a lower alkyl (viz, eight carbons or less) such as methyl, ethyl, propyl, isopropyl and butyl, a lower alkenyl such as allyl, an aralkyl such as phenyl-lower alkyl including benzyl, phenethyl, phenylpropyl, phenylisopropyl, p-chlorobenzyl, benzhydryl, trityl or a phenyl-lower alkenyl such as cinnamyl, A is a lower straight or branched alkylene advisably of 1 to 5 carbons such as methylene, ethylene or propylene, and $R_1$ and $R_2$ are the same or different members of the group consisting of hydrogen, lower alkyls such as methyl, ethyl, propyl, isopropyl and butyl, lower alkenyls such as allyl, aryl groups and particularly phenyl including nuclear substituted phenyl groups, aralkyl groups such as trityl and benzhydryl and particularly phenyl-lower alkyl groups including benzyl, phenylethyl and phenylisopropyl, cycloalkyl groups and particularly such groups having 5 to 7 carbons including cyclopentyl and cyclohexyl, cycloalkyl-lower alkyl groups such as cyclohexyl-methyl and cyclopentyl-ethyl, quinuclidinyl and groups in which

represents a heterocyclic amino group such as morpholino, pyrrolidino, piperidino, 1,2,3,4-tetrahydroquinolino, 1,2,3,4-tetrahydroisoquinolino, N-lower alkyl-piperazino groups such as N-methyl-piperazino, N-(phenyl-lower alkyl)-piperazino groups such as N-benzylpiperazino and 4-(alpha-methylphenethyl)-piperazino and N-(hydroxy-lower alkyl)-piperazino groups such as 4-(beta-hydroxyethyl)-piperazino.

Such compounds of this invention in which $R_1$ and $R_2$ are both substituents other than hydrogen are produced by reacting an 11-alkali metal salt of 5-substituted-5,6-dihydromorphanthridine with the appropriate disubstituted aminoalkylhalide or disubstituted aminoalkyl para-toluenesulfonate. This process can be represented as follows:

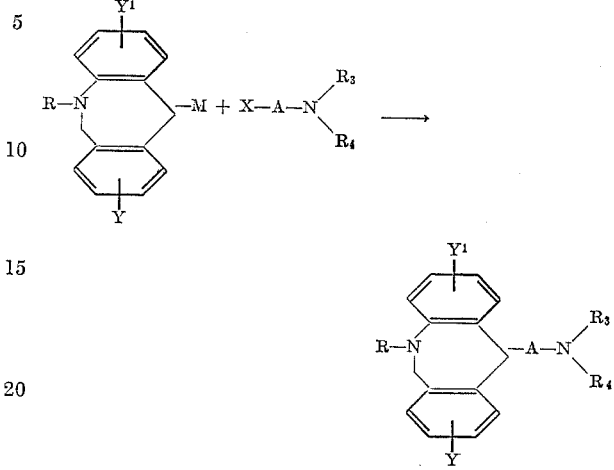

wherein M is an alkali metal and particularly is lithium, sodium or potassium, X is a reactive halogen and particularly is chlorine, bromine or iodine, or the p-toluenesulfonate group, Y, $Y^1$, A and R have the significance previously assigned and $R_3$ and $R_4$ have the same meaning as $R_1$ and $R_2$ but neither is hydrogen.

The 11-alkali metal salts of 5-substituted 5,6-dihydromorphanthridine used in the process are prepared by reacting a 5-substituted-5,6-dihydromorphanthridine with an alkali metal alkyl or aryl compound such as butyl lithium, phenyl lithium, propyl sodium and butyl potassium, advisably in about 10% excess. The reaction is readily effected by bringing the reactants together in an inert anhydrous liquid reaction medium such as ethyl ether, xylene, toluene, tetralin, cumene and tetrahydrofuran, and compatible mixtures of such solvents. The reaction can be effected at room temperature or elevated temperatures depending on the reactivity of the alkali metal compound used in the process. The reaction is substantially complete in 1 to 4 hours. Following termination of the reaction the product can be isolated, if desired, but this is ordinarily not done since it can be used as present in the reaction mixture.

Some of the 11-alkali metal salts of 5-substituted 5,6-dihydromorphanthridines which are produced as described are the 11-sodium, 11-potassium or 11-lithium salts of 5-methyl-5,6-dihydromorphanthridine,
5-ethyl-5,6-dihydromorphanthridine,
5-isopropyl-5,6-dihydromorphanthridine,
5-benzyl-5,6-dihydromorphanthridine,
5-phenethyl-5,6-dihydromorphanthridine,
5-allyl-5,6-dihydromorphanthridine and
5-cinnamyl-5,6-dihydromorphanthridine.

Reaction between the alkali metal salt of a 5-substituted 5,6-dihydromorphanthridine and the disubstituted aminoalkyl halide, or p-toluenesulfonate, can be effected by bringing the reactants together, advisably in equimolar amounts, in a suitable inert high boiling liquid reaction medium such as dioxane, toluene, xylene, ethyl ether, tetralin, cumene and tetrahydrofuran. The reaction mixture from the formation of the 11-alkali metal salt of the 5-substituted 5,6-dihydromorphanthridine can be used as the reactant and solvent source to which the appropriate aminoalkyl halide reactant can be added. The reaction proceeds at room temperature although slightly elevated temperatures can also be used. About 3 to 20 hours is generally adequate to substantially complete the reaction. After the reaction is terminated the product can be recovered by filtering the reaction mixture, distilling off the solvent and fractionally distilling the high boiling base in vacuo.

Among the disubstituted aminoalkyl halides, or p-toluenesulfonates which can be used in the process are dimethylaminoethyl chloride, diethylaminoethyl bromide, diphenylaminopropyl p-toluenesulfonate, dibenzylaminoethyl chloride, dicyclohexylaminoethyl bromide, piperidinopropyl chloride, morpholinoethyl bromide, pyrrolidinoethyl chloride, 4-methylpiperazinoethyl chloride, quinuclidinobutyl chloride, N-methyl-N-benzylaminoethyl chloride and N-phenyl-N-benzylaminopentyl bromide.

Some of the compounds which are produced according to this process are:

11-(3-dimethylaminopropyl)-5-methyl-5,6-dihydromorphanthridine,
11-(2-dibenzylaminoethyl)-5-ethyl-5,6-dihydromorphanthridine,
11-(3-dimethylaminopropyl)-5-trityl-5,6-dihydromorphanthridine,
11-(diphenylaminomethyl)-5-benzyl-5,6-dihydromorphanthridine,
11-(4-piperidinobutyl)-5-allyl-5,6-dihydromorphanthridine,
11-(3-N-methyl-N-benzylaminopropyl)-2-chloro-5-methyl-5,6-dihydromorphanthridine,
11-(3-N-methyl-N-benzylaminopropyl)-2,9-dichloro-5-methyl-5,6-dihydromorphanthridine,
11-(3-N-methyl-N-benzylaminopropyl)-2-trifluoromethyl-5-methyl-5,6-dihydromorphanthridine,
11-(4-methylpiperazinopropyl)-5-cinnamyl-5,6-dihydromorphanthridine,
11-(3-pyrrolidinopropyl)-5-methyl-5,6-dihydromorphanthridine, and
11-(3-N-methyl-N-benzylaminopropyl)-5-methyl-5,6-dihydromorphanthridine.

The compounds of the formulae

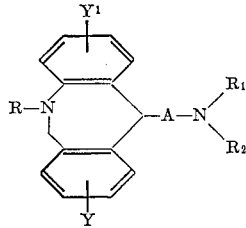

wherein A has the assigned significance, and at least one of R, R₁ and/or R₂ is trityl can be treated with a weak acidic solution, such as 50% acetic acid, to cleave the trityl group and produce compounds in which R, R₁ and/or R₂ is hydrogen.

Representative of the products obtained in this way are:

11-(2-aminoethyl)-5-ethyl-5,6-dihydromorphanthridine,
11-(3-N-methylaminopropyl)-5-methyl-5,6-dihydromorphanthridine,
11-(3-dimethylaminopropyl)-5,6-dihydromorphanthridine,
11-(3-aminopropyl)-5-methyl-5,6-dihydromorphanthridine,
11-(2-benzylaminoethyl)-5-ethyl-5,6-dihydromorphanthridine,
11-(3-aminopropyl)-5,6-dihydromorphanthridine,
11-(3-N-methylaminopropyl)-2-chloro-5-methyl-5,6-dihydromorphanthridine,
11-(3-N-methylaminopropyl)-2,9-dichloro-5-methyl-5,6-dihydromorphanthridine,
11-(3-methylaminopropyl)-2-trifluoromethyl-5-methyl-5,6-dihydromorphanthridine,
11-(3-N-methyl-N-aminopropyl)-2-methyl-5-ethyl-5,6-dihydromorphanthridine,
11-(3-N-methyl-N-aminopropyl)-2-thiomethyl-5-methyl-5,6-dihydromorphanthridine,
11-(3-N-methyl-N-aminopropyl)-2-methoxy-5-methyl-5,6-dihydromorphanthridine,
11 - (3 - N - allyl - N - aminopropyl) - 2 - chloro - 5-allyl-5,6-dihydromorphanthridine, and
11 - (2 - N - ethyl - N - aminoethyl) - 2 - trifluoromethyl-5-ethyl-5,6-dihydromorphanthridine.

Those compounds of this invention in which R₁ and/or R₂ is a benzyl group can be converted to the corresponding compounds in which R₁ and/or R₂ is hydrogen by debenzylation using a chloroformic acid ester or chlorothioformic acid ester to form an intermediate carbamate and then hydrolyzing to cleave the acyloxy group. This process can be represented as follows:

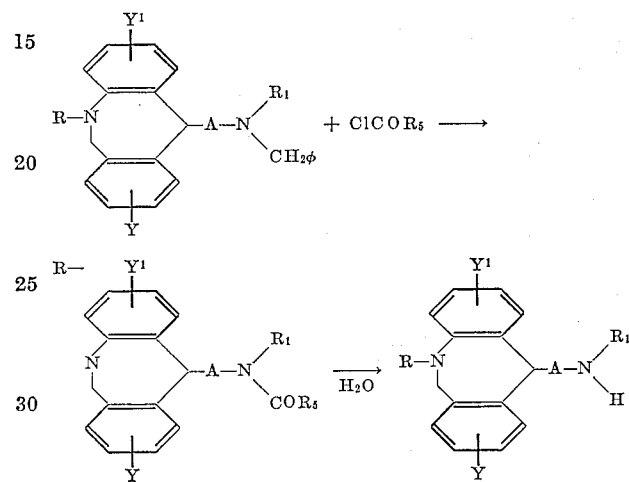

wherein R and R₁ have the assigned meaning but are not benzyl, Y and Y¹ have the assigned meaning and R₅ is a lower alkoxy such as methoxy and ethoxy, a lower thioalkyl such as thiomethyl, thioethyl and thiopropyl, phenoxy and thiophenyl. The J. Org. Chem. 26, 4057 (1961) illustrates other applications of the process.

Among the chloroformates which can be used in the first step of the process are methyl chloroformate, ethyl chloroformate, phenyl chloroformate, methylthiochloroformate, ethylthiochloroformate and phenylthiochloroformate.

The debenzylation reaction is readily effected by bringing the reactants together in a suitable inert solvent at from about room temperature to about 200° C. Benzene is a particularly useful reaction medium and with it a reaction temperature of about 80° C. is suitable. Preferably, the reaction mixture is refluxed for about 5 to 20 hours before reaction is terminated. The intermediate carbamate is isolated from the reaction mixture by conventional methods.

Some of the intermediate carbamates formed in this manner are 5-methyl - 11{3-[N - ethyl - N - (carbomethoxy)amino]propyl} - 5,6 - dihydromorphanthridine, 5-ethyl - 11{3 - [N - methyl - N - (carbethoxy)amino]propyl} - 5,6 - dihydromorphanthridine, 5 - methyl - 11{3-[N-methyl - N - (phenoxycarbonyl)amino]propyl} - 5,6 - dihydromorphanthridine, 2 - chloro - 5 - methyl - 11{3-[N-methyl - N - (carbethoxy)amino]propyl} - 5,6 - dihydromorphanthridine and 2 - trifluoromethyl - 5 - methyl-11-{3 - [N - methyl-N-(carbethoxy)amino]propyl} - 5,6-dihydromorphanthridine.

The carboxy group can be cleaved by acid or base hydrolysis and preferably with a base such as barium, calcium, lithium, sodium or potassium hydroxide, or an acid such as acetic acid, hydrobromic acid, hydrochloric acid or p-toluenesulfonic acid. The rate of hydrolysis is increased by heating the hydrolysis mixture, such as at reflux. Following the hydrolysis the reaction mixture can be neutralized and the product extracted.

Typical of the compounds produced by hydrolysis of the carboxy group are 5-methyl - 11 - [3 - (N - ethylamino)] - propyl - 5,6 - dihydromorphanthridine, 5-ethyl- 11-[3 - (N - methylamino)] - propyl - 5,6 - dihydromorphanthridine and 5 - methyl - 11 - [3 - (N - methylamino)]-propyl-5,6-dihydromorphanthridine.

These compounds can also be produced by reacting an 11-alkali metal salt of a 5-substituted-5,6 - dihydromorphanthridine with a 2-tetrahydropyranyloxy halide followed by cleavage of the tetrahydropyranyl moiety to form an alcohol, esterification of the alcohol to an active ester and reaction of the ester with a primary or secondary amine. This process can be represented as follows:

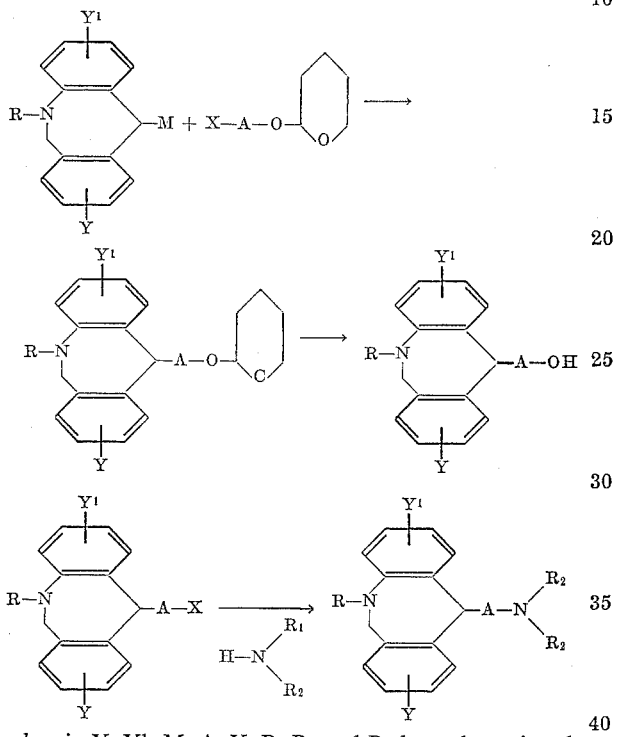

wherein Y, Y¹, M, A, X, R, R₁ and R₂ have the assigned significance but R is not hydrogen. The reaction mixture of the 11-alkali metal salt of the 5-substituted-5,6-dihydromorphanthridine, formed as described previously, can be used to react with the 2-tetrahydropyranyloxyalkyl halide. The reaction proceeds at room temperature although slightly elevated temperatures can also be used.

Some of the 2-tetrahydropyranyloxyalkyl halides which can be used are 2-tetrahydropyranyloxypropyl chloride and
2-tetrahydropyranyloxypropyl bromide.

Also, other active esters such as the tosylate can be used.

Some of the intermediates formed that can be named are:

11-[3-(2-tetrahydropyranyloxy)propyl]-5-methyl-5,6-dihydromorphanthridine,
11-[3-(2-tetrahydropyranyloxy)propyl]-2-chloro-5-methyl-5,6-dihydromorphanthridine and
11-[3-(2-tetrahydropyranyloxy)propyl]-2-trifluoromethyl-5-methyl-5,6-dihydromorphanthridine.

The 2-tetrahydropyranyloxy group can be cleaved with an aqueous acid such as hydrochloric acid or sulfuric acid with the use of an organic solvent as needed to solubilize the morphanthridine compound. The cleavage is readily effected. Some of the resulting intermediates that are formed in this manner are:

11-(3-hydroxypropyl)-5-methyl-5,6-dihydromorphanthridine,
11-(3-hydroxypropyl)-2-chloro-5-methyl-5,6-dihydromorphanthridine and
11-(3-hydroxypropyl)-2-trifluoromethyl-5-methyl-5,6-dihydromorphanthridine.

Such alcohols can be converted to active esters such as the alkylhalides and alkyl tosylates by reacting the alcohols with esterifying agents such as phosphorous pentachloride, thionylchloride and p-toluenesulfonyl chloride.

Some of the active esters so produced are 11-(3-chloropropyl)-5-methyl-5,6-dihydromorophanthridine,
11-(3-bromopropyl)-2-chloro-5-methyl-5,6-dihydromorphanthridine and
11-(3-tosyloxypropyl)-2-trifluoromethyl-5-methyl-5,6-dihydromorphanthridine.

By reacting the active esters with an appropriate primary or secondary amine, or ammonia the desired final products (as previously named) can be obtained. Some amines which can be used as reactants are methylamine, phenylamine, benzylamine, dimethylamine and dibenzylamine.

Another process of producing the compounds of this invention comprises reacting an 11-alkali metal salt of a 5-substituted-5,6-dihydromorphanthridine with a benzyloxyalkyl halide to form an 11-(benzyloxyalkyl)-5-substituted-5,6-dihydromorphanthridine, cleaving the benzyloxy group with aqueous acid to form an alcohol, converting the alcohol to an active ester and then reacting the active ester with ammonia or an amine to form the desired compound. This process can be represented as follows

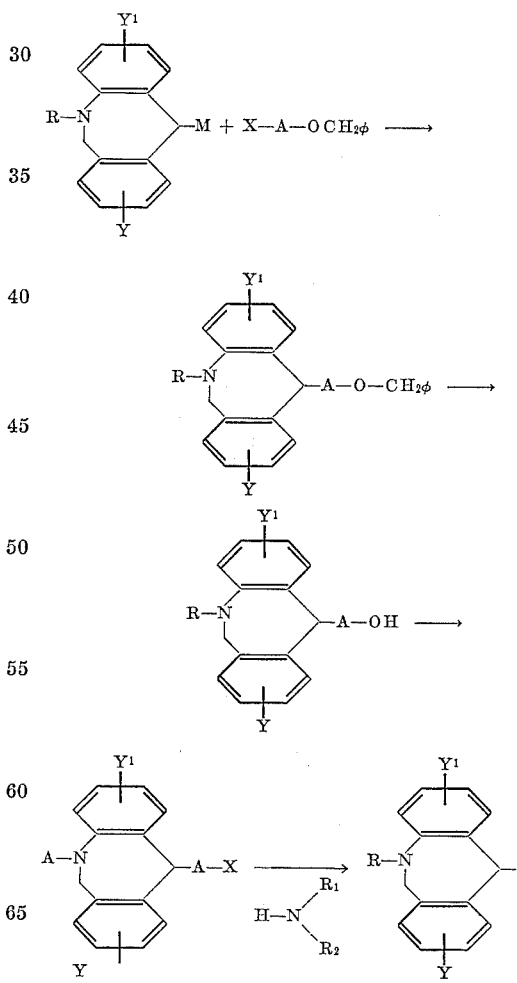

wherein M, Y, Y¹, X, A, R, R₁ and R₂ have the assigned meaning but R is not hydrogen in this instance and φ represents phenyl.

The steps in the reaction can be effected by conventional means and as described herein. Cleavage of the benzyloxy group can be effected with aqueous acid such as paratoluene sulfonic acid, hydrochloric acid and sulfuric acid. If strong conditions are used such as 48% HBr the cleavage is effected with the direct formation of the active ester instead of first forming an alcohol.

According to a further aspect of this invention there are provided novel basic 5,6-dihydromorphanthridines of the formula

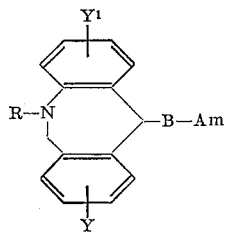

wherein Y, Y¹ and R have the meaning assigned above, B is a single chemical bond or a straight or branched lower alkylene, advisably of 1 to 5 carbons such as methylene, ethylene or propylene, and Am is a cyclic amino group such as Pyridyl,
Pyrrolidyl,
Piperidyl,
N-lower alkyl piperidyl such as
N-methyl piperidyl,
N-(phenyl-lower alkyl)-piperidyl such as
N-benzyl-3-piperidyl,
N-lower alkyl pyrrolidyl such as
N-ethyl-3-pyrrolidyl,
N-(phenyl-lower alkyl)-pyrrolidyl such as
N-phenethyl-3-pyrrolidyl,
N-(di-lower alkyl amino-lower alkyl)-piperidyl or pyrrolidyl such as
N-(beta-dimethylaminopropyl)-4-piperidyl,
N-lower alkanoyl-piperidyl or pyrrolidyl such as
N-acetyl-3-piperidyl,
N-(phenyl-lower alkanoyl)-piperidyl or pyrrolidyl such as
N-benzoyl-3-piperidyl and quinuclidinyl, but B is an alkylene when Am is a 2-pyridyl, 2-piperidyl, 2-pyrrolidyl or 2-quinuclidinyl with or without an N-substituent.

These compounds are produced by reacting an 11-alkali metal salt of a 5-substituted-5,6-dihydromorphanthridine with the appropriate heterocyclic halide or heterocyclic alkyl halide. This process can be represented as follows:

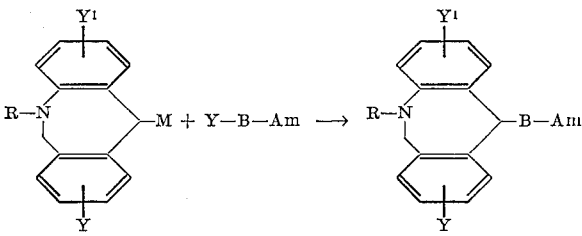

wherein X is a reactive halogen or p-toluene sulfonate and Y, Y¹, M, R, B and Am have the assigned significance but R is not hydrogen.

Some of the heterocyclic halides and heterocyclic alkyl halides which can be used as reactants are N-methyl-3-chloropiperidine,
N-ethyl-4-bromopiperidine,
N-benzyl-3-chloropiperidine,
N-benzyl-4-chloropiperidine,
N-phenylpropyl-3-bromopiperidine,
N-methyl-3-chloropyrrolidine,
N-benzyl-3-bromopyrrolidine,
N-isopropyl-4-bromopyrrolidine,
N-(beta-diethylaminoethyl)-3-chloropiperidine,
3-chloroquinuclidine,
N-ethyl-3-chloromethylpiperidine,
N-benzyl-4-(3-bromopropyl)piperidine,
N-ethyl-2-(2-chloroethyl)pyrrolidine,
N-benzyl-3-chloromethylpyrrolidine and
4-chloromethylquinuclidine.

The reaction can be effected using the conditions previously given for the previous process.

Some of the compounds which are produced according to this procedure are:

11-(3-pyridyl)-5-methyl-5,6-dihydromorphanthridine,
11-(3-pyridyl)-2-chloro-5-methyl-5,6-dihydromorphanthridine,
11-(N-methyl-4-piperidyl)-5-methyl-5,6-dihydromorphanthridine,
11-(N-methyl-4-piperidyl)-2,5-dimethyl-5,6-dihydromorphanthridine,
11-(N-methyl-3-piperidyl)-5-methyl-5,6-dihydromorphanthridine,
11-(N-benzyl-3-piperidyl)-5-methyl-5,6-dihydromorphanthridine,
11-(N-ethyl-3-pyrrolidyl)-5-methyl-5,6-dihydromorphanthridine,
11-(N-ethyl-3-pyrrolidyl)-5-trifluoromethyl-5-methyl-5,6-dihydromorphanthridine,
11-(N-benzyl-3-pyrrolidyl)-5-ethyl-5,6-dihydromorphanthridine,
11 - [(N-ethyl-3-piperidyl)methyl]-5-methyl-5,6-dihydromorphanthridine,
11 - [2 - (N-benzyl-4-piperidyl)ethyl]-5-benzyl-5,6-dihydromorphanthridine,
11 - [2-(N-benzyl-4-piperidyl)ethyl]-2-methoxy-5-methyl-5,6-dihydromorphanthridine,
11 - [3-(N-ethyl-2-pyrrolidyl)propyl]-5-allyl-5,6-dihydromorphanthridine,
11 - [3-(N-ethyl-2-pyrrolidyl)propyl]-2,9-dichloro-5-allyl-5,6-dihydromorphanthridine,
11 - [4-(N-phenethyl-3-pyrrolidyl)butyl]-5-cinnamyl-5,6-dihydromorphanthridine and
11 - [2-(3-quinuclidinyl)-ethyl]-5-methyl-5,6-dihydromorphanthridine.

These and similar compounds having an N-trityl group on the pyrrolidyl or piperidyl groups, as well as on the 5-position of the morphanthridine ring, can be treated with 50% acetic acid to cleave the trityl group.

The compounds of this invention, other than the alkali metal salts, form water soluble acid addition salts with organic and inorganic acids such as hydrochloric acid, hydrobromic acid, sulphuric acid, phosphoric acid, methane sulphonic acid, ethane disulphonic acid, acetic acid, citric acid, maleic acid, succinic acid, tartaric acid, benzoic acid and phthalic acid.

The compounds of this invention, other than the intermediate alkali metal salts, have anticholinergic and analgetic activity. They thus can be used in pharmacological studies and as screening agents. Actual use in animals and humans for these purposes is also indicated. In addition, these compounds have antispasmodic, antidepressant and tranquilizing effects. They can also be used as neutralizing agents and in purifying penicillin with which they form salts.

The compounds can be administered to animals as pure compounds, in the form of a pharmaceutically acceptable non-toxic acid addition salt, but to obtain a more practical size to dosage relationship one or more of the compounds is combined with a suitable pharmaceutical carrier and made into unit-dosage forms.

Pharmaceutical carriers which are liquid or solid can be used. The preferred liquid carrier is water. Flavoring materials can be included in the solutions as desired.

Solid pharmaceutical carriers such as starch, sugar and talc can be used to form powders. The powders can be used as such or be tableted, or be used to fill gelatin capsules. Suitable lubricants like magnesium stearate, binders such as gelatin and disintegrating agents like sodium carbonate in combination with citric acid can be used to form the tablets.

Unit dosage forms such as tablets and capsules can contain any suitable predetermined amount of one or more of the compounds and can be administered one or more at a time at regular intervals. Such unit dosage forms can contain 1 to 100 mg. or more of an active compound of this invention. The total amount of active compound administered must be ultimately fixed by reference to the disease to be treated.

A typical tablet can have the composition:

| | Mg. |
|---|---|
| 11 - (3 - methylamino)propyl-5-methyl-5,6-dihydromorphanthridine dimaleate | 10 |
| Lactose | 136.5 |
| Corn starch | 20 |
| Corn starch (as 10% starch paste) | 3.4 |
| Magnesium stearate | 1.3 |

A $\frac{5}{16}$ inch diameter standard concave punch is used to compress the composition into a tablet.

The following examples are presented to illustrate the invention.

EXAMPLE 1

*11 - (3 - dimethylaminopropyl)-5-methyl-5,6-dihydromorphanthridine dihydrochloride*

A solution of 31.4 g. (0.15 mole) of 5-methyl-5,6-dihydromorphanthridine in 265 cc. of tetrahydrofuran was cooled in icewater and while stirring, treated with a solution of 101 cc. (0.165 mole) of butyllithium solution of 150 cc. of ether over a period of 30 minutes. After stirring the solution at room temperature for 5 hours, a solution of 18.3 g. (0.15 mole) of freshly distilled dimethylaminopropyl chloride in 90 cc. of ether was added in 40 minutes, and the resulting cloudy solution was stirred at room temperature for 9 hours. The solution was then washed with water to remove the salt, dried over calcium sulfate, filtered and distilled twice through a short column, yielding 28.9 g. (65%) of a very viscous base, B.P. 156–159° C. (0.125 mm.).

*Anal.*—Calcd. for $C_{20}H_{26}N_2$: N, 9.52. Found: N, 9.13.

A 10 g. sample of the base was dissolved in 1 liter of dry ether and acidified with ethereal hydrochloric acid. The precipitate was collected by filtration, rinsed with ether and dried in a vacuum desiccator, yielding 13.5 g. of a grey hygroscopic solid.

*Anal.*—Calcd. for $C_{20}H_{28}Cl_2N_2$: N, 7.62; Cl, 19.30. Found: N, 7.36; Cl, 19.20.

EXAMPLE 2

*11-(N-methyl-4-piperidyl)-5-methyl-5,6-dihydromorphanthridine*

To a cooled solution of 31.4 g. (0.15 mole) of N-methyl-5,6-dihydromorphanthridine in 265 cc. of tetrahydrofuran was added dropwise, in 1 hour, a solution of 109 cc. (0.165 mole) of butyllithium solution in 150 cc. of ether. The resulting dark solution was stirred at room temperature for 4 hours. A solution of 20.1 g. (0.15 mole) of N-methyl-4-chloropiperidine in 90 cc. of ether was then added dropwise in 1 hour and the resulting mixture was stirred overnight at room temperature. The mixture was taken to dryness, the residue dissolved in dilute hydrochloric acid and extracted with ether (discarded). The aqueous solution was made alkaline with potassium hydroxide and the resulting oil was extracted with ether, dried over potassium carbonate, filtered and distilled twice, yielding 20.3 g. (45%), B.P. 162–167° C. (0.1 mm.), M.P. 75–80° C. Recrystallization from acetonitrile afforded a pure sample, M.P. 88–89° C.

*Anal.*—Calcd. for $C_{21}H_{26}N_2$: C, 82.30; H, 8.55; N, 9.14. Found: C, 82.39; H, 8.50; N, 9.16.

EXAMPLE 3

*11-[3-(N-methyl-N-benzylamino)propyl]-5-methyl-5,6-dihydromorphanthridine*

To a cooled solution of 41.8 g. (0.2 mole) of 5-methyl-5,6-dihydromorphanthridine in 300 cc. of tetrahydrofuran was added dropwise a solution of 138 cc. (0.22 mole) of commercial butyllithium solution in 200 cc. of dry ether. After having stirred 5 hours at room temperature, the solution was cooled again and a solution of 39.5 g. (0.2 mole) of 3-(N-methyl-N-benzylamino)-1-chloropropane in 120 cc. of ether was added dropwise. After having stirred all night at room temperature, 60 cc. of water was added, the organic layer was separated, dried and concentrated. The residue was distilled to give 64.8 g. of product, B.P. 225° C. (0.2 mm.).

*Anal.*—Calcd. for $C_{26}H_{30}N_2$: C, 84.28; H, 8.16; N, 7.56. Found: C, 84.15; H, 8.38; N, 7.63.

A di-cyclohexylsulfamic acid salt was prepared in alcohol-ether from which the salt could also be recrystallized, M.P. 119° C.

*Anal.*—Calcd. for $C_{38}H_{56}N_4O_6S_2$: N(non-aq.), 3.84; N(total), 7.69. Found: N(non-aq.), 3.84; N(total), 7.74.

EXAMPLE 4

*11-(3-piperidinopropyl)-5-methyl-5,6-dihydromorphanthridine*

To a cooled solution of 20.9 g. (0.1 mole) of 5-methyl-5,6-dihydromorphanthridine in 175 cc. of tetrahydrofuran was added dropwise a solution of 69 cc. (0.11 mole) of commercial butyllithium solution in 100 cc. of ether. The solution was cooled after having stirred five hours at room temperature, and a solution of 16.2 g. (0.1 mole) of 3-piperidino-1-chloropropane in 60 cc. of ether was added dropwise. After stirring overnight at room temperature, 30 cc. of water was added, the organic layer was separated, dried, and concentrated. The residue was distilled and gave 28.1 g., B.P. 190° C. (0.08 mm.).

*Anal.*—Calcd. for $C_{23}H_{30}N_2$: N, 8.38. Found: N, 8.43.

EXAMPLE 5

*11-[3-(N'-methylpiperazino)-propyl]-5-methyl-5,6-dihydromorphanthridine*

To a cooled solution of 18.8 g. (0.09 mole) of 5-methyl-5,6-dihydromorphanthridine in 160 cc. of tetrahydrofuran was added dropwise a solution of 62 cc. (0.1 mole) of commercial butyllithium solution in 90 cc. of ether. After being stirred 5 hours at room temperature, a solution of 15.9 g. (0.09 mole) of 1-(3-chloropropyl)-4-methylpiperazine in 60 cc. of ether was added dropwise. After being stirred all night at room temperature, 27 cc. of water was added, the organic layer was separated, dried and concentrated. The residue was distilled to give 18.7 g. product, B.P. 195° C. (0.1 mm.).

*Anal.*—Calcd. for $C_{23}H_{31}N_3$: N, 12.06. Found: N, 11.54.

EXAMPLE 6

*11-(3-dimethylaminopropyl)-5-benzyl-5,6-dihydromorphanthridine*

To a solution of 13.1 g. (0.046 mole) of 5-benzyl-5,6-dihydromorphanthridine in 100 cc. of tetrahydrofuran was added while cooling, 0.05 mole of commercial butyllithium solution in 100 cc. of ether. The solution was stirred for 4 hours at room temperature. To this solution was added dropwise at room temperature 5.6 g. (0.046 mole) of 3-dimethylaminopropylchloride in 50 cc. of ether and the mixture was stirred overnight. Water (50 cc.) was added and the organic layer was separated, dried and concentrated to a 17 g. residue. A small part (4.4 g.) of this residue was distilled and gave a fraction (3.1 g.) which boiled at 210–225° C. (0.12 mm.). A dicyclohexylsulfamic acid salt was prepared from 1.9 g. of base in alcohol-ether; M.P. 127–131° C.

*Anal.*—Calcd. for $C_{38}H_{56}N_4O_6S_2$: N(non-aq.), 3.84; N(total) 7.69. Found: N(non-aq.), 4.15; N(total) 7.74.

EXAMPLE 7

*11-{3-[N-methyl-N-(S-methylthiocarbonyl)amino]propyl}-5-methyl-5,6-dihydromorphanthridine*

A solution of 7.4 g. (0.02 mole) of 11-[3-(N-methyl-N - benzylamino)propyl] - 5 - methyl - 5,6 - dihydromorphanthridine and 2.42 g. (0.022 mole) of methylthiochloroformate in 20 cc. of dry benzene was refluxed for 24 hrs. The solution was distilled with steam, the residue taken up in benzene, the benzene layer was extracted with dilute aqueous HCl, washed with water, dried, filtered and concentrated to leave 6.6 g. of a yellow oil.

*Anal.*—Calcd. for $C_{21}H_{26}N_2OS$: S, 9.04. Found: S, 8.27.

EXAMPLE 8

*11-(3-methylaminopropyl)-5-methyl-5,6-dihydromorphanthridine*

A mixture of 9.85 g. (0.0137 mole) of 11-{3-[N-methyl - N - (S - methylthiocarbonyl) - amino]propyl}-5 - methyl - 5,6 - dihydromorphanthridine, 7 g. of $Ba(OH)_2 \cdot 8H_2O$, and 55 cc. of ethyleneglycol was stirred and refluxed for 9 hours. The mixture was poured into water, the solid was removed by filtration and was rinsed with benzene. The filtrate was extracted with benzene and the combined benzene layers were extracted with dilute HCl. The aqueous extract was extracted with ether (discarded), cooled, made alkaline with KOH and extracted with ether. The ethereal extracts were dried over potassium carbonate, filtered, and taken to dryness to leave 3 g. of a yellow oil, which on distillation gave 2.35 g. of product, B.P. 170° C. (0.05 mm.).

*Anal.*—Calcd. for $C_{19}H_{24}N_2$: N, 9.99. Found: N, 9.81.

EXAMPLE 9

*11-(4-dimethylamino-2-butyl)-5-methyl-5,6-dihydromorphanthridine*

To a cooled solution of 20.9 gms. (0.1 mole) of 5-methyl - 5,6 - dihydromorphanthridine in 180 cc. of tetrahydrofuran was added dropwise a solution of 66 cc. (0.11 mole) of commercial butyllithium solution in 100 cc. of dry ether. The solution was cooled after having stirred four hours at room temperature and a solution of 13.55 gms. (0.1 mole) of 1-dimethylamino-3-chlorobutane in 75 cc. of dry ether was added dropwise. After stirring overnight at room temperature, 50 cc. of water was added, the organic layer was separated, washed with 50 cc. of water, dried and concentrated. The residue was distilled and gave 14.75 gms., B.P. 145–147.5° C./0.12 mm.

A di-cyclohexylsulfamic acid salt was prepared, M.P. 120° C.

EXAMPLE 10

*2-chloro-5-methyl-11-[3-(N-methyl-N-benzylamino)-propyl]-5,6-dihydromorphanthridine*

Butyl lithium (48 ml., 0.73 mole) dissolved in 70 ml. of anhydrous ethyl ether was added dropwise in 0.5 hrs. to a cooled solution of 17.0 g. (0.07 mole) of 2-chloro-5 - methyl - 5,6 - dihydromorphanthridine dissolved in 100 ml. of tetrahydrofuran after which the solution was stirred at room temperature for 5 hours. Freshly distilled 1-chloro-3-(N-methyl-N-benzylamino)propane dissolved in 40 ml. of anhydrous ethyl ether was added dropwise in 0.2 hr. with cooling and the solution was stirred at room temperature for 16 hours after which 21 ml. of water was added. The organic layer was separated, dried, and taken to dryness in vacuo to yield a heavy brown oil which was fractionated to give 22.3 g. (78.5%), B.P. 163–170° C. (0.35 mm.) of the product.

*Di-cyclohexylsulfamate.*—This salt was formed after several days from alcoholic solutions of the base and hexamic acid diluted with ethyl ether, and recrystallized twice from isopropyl alcohol, M.P. 122–124° C.

*Anal.*—Calcd. for $C_{38}H_{55}ClN_4O_6S_2$: C, 59.78; H, 7.28; N, 7.34. Found: C. 59.56; H, 7.46; N, 7.41.

EXAMPLE 11

*2-chloro-5-methyl-11-[3-(N-methyl-N-carbethoxy-amino)propyl]-5,6-dihydromorphanthridine*

Ethylchloroformate (5.35 g., 0.05 mole) was added dropwise to a solution of 16.8 g. (0.041 mole) of 2-chloro - 5 - methyl - 11 - [3 - (N - methyl - N - benzyl amino)propyl]5,6 - dihydromorphanthridine in 50 ml. of benzene at room temperature. The solution was refluxed for 20 hours after which it was steam distilled. The residue was dissolved in 100 ml. of benzene, extracted once with 100 ml. of 10% dilute hydrochloric acid, washed with water, dried and taken to dryness in vacuo to yield a heavy syrup which was fractionated three times to yield 7.9 g. (63%) B.P. 215–220° C. (0.4 mm.).

*Anal.*—Calcd. for $C_{22}H_{27}ClN_2O_2$: C, 68.28; H, 7.03; N, 7.24. Found: C, 66.58; H, 7.02; N, 6.97.

EXAMPLE 12

*2-chloro-5-methyl-11-[3-(N-methylamino)propyl]-5,6-dihydromorphanthridine*

A mixture of 9.7 g. (0.025 mole) of 2-chloro-5-methyl-11- [3 - (N - methyl - N - carbethoxyamino)propyl]-5,6-dihydromorphanthridine, 200 ml. of ethylene glycol and 15.8 g. (0.05 mole) of barium hydroxide was refluxed for 8 hours after which it was poured into 500 ml. of water and filtered. The collected solids were washed thoroughly with benzene which was combined with benzene extraction of the filtrate, dried and taken to dryness in vacuo to yield 7.8 g. (99%) of the crude base.

*Dihydrochloride.*—This salt was prepared from an ethereal solution of the base and anhydrous hydrochloric acid and recrystallized twice from isopropanol-ether solutions to yield 3.5 g. (36.5%). M.P. 192–194° C.

*Anal.*—Calcd. for $C_{19}H_{25}Cl_3N_2$: C, 58.84; H. 6.49; N, 7.22; Cl, 18.28. Found: C, 59.07; H, 6.54; N, 7.14; Cl, 18.01.

Various changes and modifications of the invention can be made and, to the extent that such variations incorporate the spirit of this invention, they are intended to be included within the scope of the appended claims.

What is claimed is:

1. A compound of the formulae

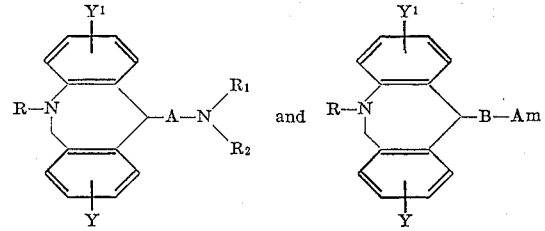

wherein Y and $Y^1$ are members of the group consisting of hydrogen, halo, lower alkoxy, lower alkyl, thio-lower alkyl and trifluoromethyl, R is a member of the group consisting of hydrogen, lower alkyl, lower alkenyl, phenyl-lower alkyl, and phenyl-lower alkenyl, A is a lower alkylene, and $R_1$ and $R_2$ are members of the group consisting of hydrogen, lower alkyl, lower alkenyl, phenyl, phenyl-lower alkyl, cycloalkyl of 5 to 7 carbons in the ring, cycloalkyl-lower alkyl in which the cycloalkyl has 5 to 7 carbons in the ring, and groups in which

represents, a heterocyclic amino of the groups consisting of morpholino, pyrrolidino, piperidino, N-lower alkyl-piperazino, N-phenyl-lower alkyl-piperazino and N-hydroxy-lower alkyl piperazino, B is a member of the group consisting of a single chemical bond and lower alkylene and Am is a member of the group consisting of pyridyl, pyrrolidyl, piperidyl, N-lower alkyl piperidyl, N-(phenyl-lower alkyl)-piperidyl, N-lower alkyl pyrroidyl and N-(phenyl-lower alkyl)-pyrrolidyl, but B is an alkylene when Am is one of the said heterocyclics bonded to the 2 position of the ring, and pharmaceutically acceptable nontoxic acid addition salts thereof.

2. A compound of the formula

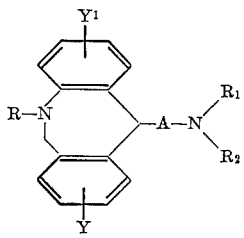

wherein Y and Y¹ are members of the group consisting of hydrogen, halo, lower alkoxy, lower alkyl, thio-lower alkyl and trifluoromethyl, R is lower alkyl, A is lower alkylene and $R_1$ nd $R_2$ are lower alkyls.

3. A compound of the formula

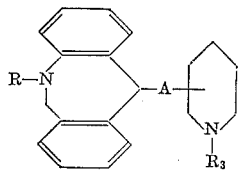

wherein R is lower alkyl, A is lower alkylene and $R_3$ is lower alkyl.

4. 11-(3-dimethylaminopropyl)-5-methyl-5,6 - dihydromorphanthridine.

5. 11-(N-methyl-4-piperidyl)-5-methyl-5,6 - dihydromorphanthridine.

6. A compound of the formula

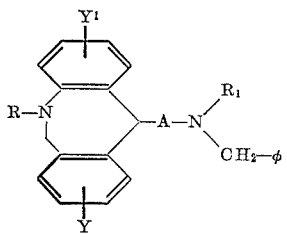

wherein Y and Y¹ are members of the group consisting of hydrogen, halo, lower alkoxy, lower alkyl, thio-lower alkyl and trifluoromethyl, R is lower alkyl, A is lower alkylene, $R_1$ is lower alkyl and $\phi$ is phenyl.

7. 11-(3-N-methyl-N-benzylaminopropyl)-5 - methyl-5,6-dihydromorphanthidine.

8. A compound of the formula

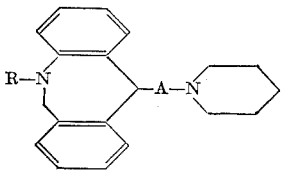

wherein R is lower alkyl and A is lower alkylene.

9. 11-(3-piperidinopropyl)-5-methyl-5,6 - dihydromorphanthridine.

10. A compound of the formula

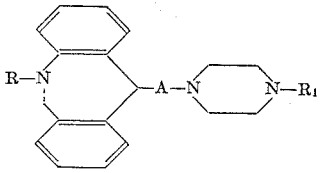

wherein R is lower alkyl, A is lower alkylene and $R_1$ is lower alkyl.

11. 11-[3-(N'-methylpiperazino)propyl]-5-methyl-5,6-dihydromorphanthridine.

12. 11-(3-di-lower alkyl-aminoalkyl)-5 - phenyl-lower alkyl-5,6-dihydromorphanthridine.

13. 11-(3-dimethylaminopropyl)-5-benzyl-5,6-dihydromorphanthridine.

14. 11 - {3 - [N-methyl-N-(S-methylthiocarbonyl)-amino]propyl}-5-methyl-5,6-dihydromorphanthridine.

15. A compound of the formula

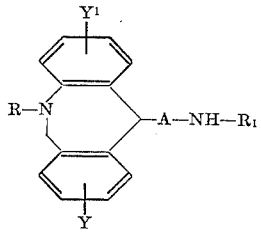

wherein Y and Y¹ are members of the group consisting of hydrogen, halo, lower alkoxy, lower alkyl, thio-lower alkyl and trifluoromethyl, R and $R_1$ are lower alkyl and A is lower alkylene.

16. 11-(3-N-methylaminopropyl)-2-chloro-5-methyl-5,6-dihydromorphanthridine.

17. 11-(3 - N-methyl-N-carbethoxyaminopropyl) - 2-chloro-5-methyl-5,6-dihydromorphanthridine.

18. 11-(3-N-methyl-N-benzylaminopropyl)-2 - chloro-5-methyl-5,6-dihydromorphanthridine.

19. 11-(3-methylaminopropyl)-5-methyl-5,6 - dihydromorphanthridine.

20. 11-(4-dimethylamino-2-butyl)-5-methyl-5,6 - dihydromorphanthridine.

References Cited by the Examiner
UNITED STATES PATENTS

| | | | |
|---|---|---|---|
| 2,800,474 | 7/1957 | Voegtli | 260—268 |
| 2,877,156 | 3/1959 | Janssen et al. | 167—65 |
| 2,951,082 | 4/1960 | Sprague et al. | 260—268 |
| 2,973,354 | 2/1961 | Werner | 260—268 |
| 2,981,736 | 4/1961 | Galliot et al. | 260—268 |
| 2,985,660 | 5/1961 | Judd et al. | 260—268 |
| 3,068,147 | 12/1962 | Emele | 167—65 |
| 3,138,584 | 6/1964 | Zdoric | 260—239 |
| 3,141,015 | 7/1964 | Biel et al. | 260—239 |
| 3,153,652 | 10/1964 | Drukker et al. | 260—268 |

OTHER REFERENCES

Zarvas et al., Journ. American Chemical Soc., vol. 78, pages 1359–63, 1956.

ALEX MAZEL, *Primary Examiner.*

NICHOLAS S. RIZZO, HENRY R. JILES, *Examiners.*

J. W. ADAMS, *Assistant Examiner.*